United States Patent [19]

Koshino et al.

[11] Patent Number: 4,548,301
[45] Date of Patent: Oct. 22, 1985

[54] NEGATIVE ACTING DISC BRAKE

[75] Inventors: Yoshinori Koshino; Shiro Nakajima, both of Itami, Japan

[73] Assignee: Sumitomo Electric Industries Ltd., Japan

[21] Appl. No.: 552,494

[22] Filed: Nov. 17, 1983

[30] Foreign Application Priority Data

Nov. 27, 1982 [JP] Japan ................................. 57-207887

[51] Int. Cl.[4] ............................................. F16D 65/38
[52] U.S. Cl. ............................ 188/196 C; 188/79.5 S; 188/196 V; 192/111 A
[58] Field of Search ............... 188/79.5 R, 79.5 S, 188/79.5 P, 79.5 GE, 71.9, 72.1, 170, 196 A, 196 C, 196 V, 196 BA, 196 B; 192/70.25, 91 R, 111 A

[56] References Cited

U.S. PATENT DOCUMENTS 3,442,357  5/1969  Farr ........................... 188/71.9 X
4,030,577  6/1977  Ogawa et al. ............... 188/72.4
4,192,405  3/1980  Lee et al. .................... 188/170

FOREIGN PATENT DOCUMENTS 0043154  11/1976  Japan .

Primary Examiner—Bruce H. Stoner, Jr.
Assistant Examiner—Robert J. Oberleitner
Attorney, Agent, or Firm—Ernest A. Beutler

[57] ABSTRACT

A negative acting disc brake provided with arrangement for automatically adjusting the clearance between the brake pads and the disc caused by abrasion of the brake pads. The entire amount of abrasion is absorbed not by a single release of brake but by several times of release of brake.

4 Claims, 2 Drawing Figures

NEGATIVE ACTING DISC BRAKE

BACKGROUND OF THE INVENTION

The present invention relates to a negative acting disc brake which is normally operative for braking under the action of a spring and is released by fluid pressure when necessary, and particularly to arrangements for automatically adjusting the clearance between the brake pads and the disc caused by abrasion of the brake pads.

A conventional disc brake of this type is disclosed in e.g. Japanese patent publication No. 51-43154 in which the disc brake comprises a piston opposed to a brake pad, an adjust bolt pressed against the piston and normally given such a turning torque by a spiral spring as to advance toward the piston, another piston threadedly engaging the adjust bolt and adapted to be retracted under fluid pressure to retract the adjust bolt when brake is released, said piston being retracted by means of a retractor provided in a cylinder.

In such a conventional disc brake, upon release of brake, the adjust bolt and the second piston move back to their original position and the piston is retracted by a predetermined stroke by the retractor. Therefore, as the brake pads abrade, some clearance will appear between the piston and the adjust bolt so that the adjust bolt will not press the piston any more. To prevent this, the adjust bolt is adapted to be turned in such a direction as to advance toward the piston by the force of the spiral spring to operatively press the piston.

In such a conventional disc brake, the clearance between the disc and the brake pad is automatically adjusted by advancing the piston for a distance corresponding to the amount of abrasion that occured at the last braking. In other words, the entire clearance therebetween is absorbed or adjusted by a single release of brake. Therefore, if the fluid pressure for brake release happens to be high, there is a possibility that the brake force after adjustment would be excessive.

BRIEF SUMMARY OF THE INVENTION

An object of the present invention is to provide a disc brake of this type which obviates the abovementioned shortcomings.

In accordance with the present invention, there is provided a negative acting disc brake comprising a torque member, an outer caliper, an inner caliper, a pair of brake pads mounted on the opposing surfaces of said outer and inner calipers, a cylinder member mounted in said inner caliper and formed with an annular flange to form therein a first cylinder and a second cylinder, a first piston mounted in said first cylinder for pressing one of said brake pads, an adjust bolt having a first threaded portion threadedly engaging said first piston, a second piston mounted in said second cylinder and adapted to engage said adjust bolt to press said first piston toward said one of said brake pads, said second piston being normally urged toward said first piston and adapted to retract when fluid pressure is applied to said second cylinder, said adjust bolt having a second threaded portion which has a larger lead than said first threaded portion and is reverse thereto in direction, a threaded socket mounted on said second threaded portion on said adjust bolt to threadedly engage it and adapted to engage said second piston, and a one-way clutch interposed between said threaded socket and said second piston so as to prevent said socket from turning when said adjust bolt turns in such a direction as to move away from said first piston and allow it to turn when said adjust bolt tends to turn in a reverse direction.

When the second piston is under fluid pressure, it will retract for a larger distance than the first piston does, by an amount corresponding to the amount of abrasion of the brake pads. Therefore, a turning torque is applied to the socket and the adjust bolt. But, the socket is prevented by the clutch from turning. Thus, the adjust bolt turns in such a direction as to come off the piston. But, since the first threaded portion has a smaller lead than the second threaded portion, the distance for which the first threaded portion moves relative to the piston is smaller than the distance for which the second threaded portion moves relative to the socket. Thus, the entire amount of wear is compensated for not by a single adjustment (that is, by a single release of the brake) but upon several releases of the brake.

Other objects and features of the present invention will become apparent from the following description taken with reference to the accompanying drawings, in which.

Figure 1:
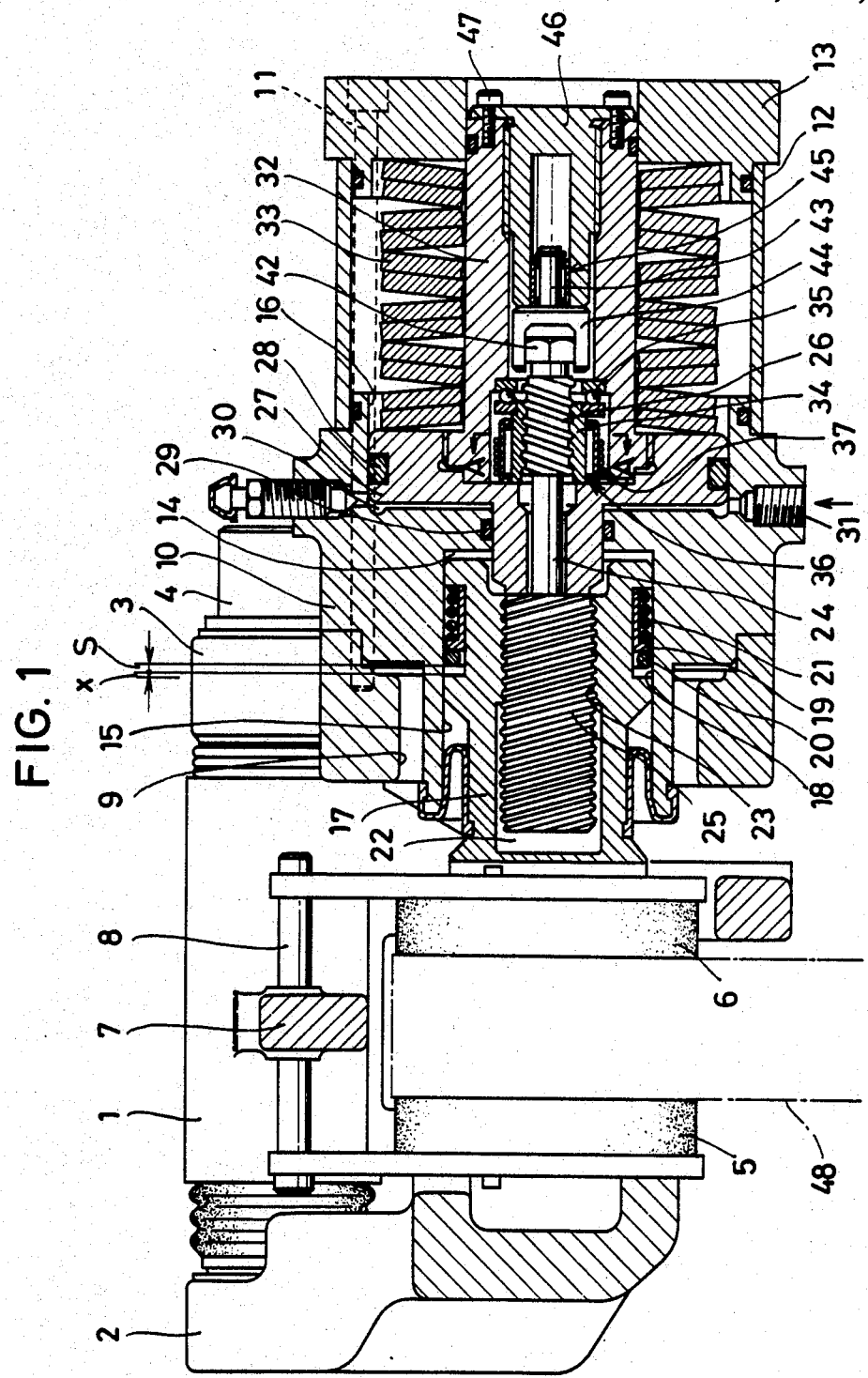
FIG. 1 is a cross-sectional view of the embodiment of this invention.

Referring to FIG. 1, the negative acting disc brake according to the present invention has a torque member 1, an outer caliper 2 and an inner caliper 3. These calipers are secured together by means of a sleeve bolt 4 extending through the torque member 1 with the torque member sandwicked therebetween. Brake pads 5, 6 are mounted on the opposing sides of the outer caliper 2 and the inner caliper 3, respectively. These brake pads are slidably supported by a pad pin 8 extending through a bridge 7 on the torque member 1.

The inner caliper 3 is formed with an opening 9 to receive a cylinder member 10 which is secured to the inner caliper 3 by a bolt 11. The bolt extends through a spring cover 12 and a spring holder 13 and secures them together with the cylinder member 10 to the inner caliper 3.

The cylinder member 10 is formed with a flange 14 on its inside. A first cylinder 15 and a second cylinder 16 are formed in the cylinder member 10 to the left and right of the flange 14, respectively. The first cylinder 15 contains a piston 17 which serves to push the brake pad 6 against a disc 48.

The piston 17 is formed with an annular groove 18 to receive a flanged sleeve 19. In the annular groove 18 and in front of the flanged sleeve 19 is mounted a retraction ring 20 which is pressed against the inner wall of the first cylinder 15 with a required frictional force. Also, a retraction spring 21 is mounted on the flanged sleeve 19 to urge it forwardly (to the left on FIG. 1). However, some gap S is normally left between the ring 20 and the front wall of the groove 18 because the frictional force of the ring 20 is set to be larger than the force of the spring 21.

The piston 17 is formed with a bore 22 which is female-threaded at 23. A male threaded portion 25 of an adjust bolt 24 threadedly engages the female threaded portion 23 on the piston. The adjust bolt 24 extends rearwardly and is provided with another threaded portion 26 which is multiple thread screw and has a larger lead than its front threaded portion 25 and is opposite thereto in direction. In the embodiment, the front threaded portion 25 is right-handed and the rear threaded portion 26 is left-handed.

An auxiliary piston 27 is slidably mounted in the second cylinder 16 on the shaft of the adjust bolt 24 and has its front edge engaging the rear end of the threaded portion 25 on the adjust bolt. Seals 28, 29 are provided between the second cylinder 16 and the auxiliary piston 27 and between the flange 14 and the piston 27, respectively. At the shoulder of the auxiliary piston 27 is formed a chamber 30 with which an inlet port 31 communicates.

To the auxiliary piston 27 is coupled a cylindrical piston shaft 32 which has its rear end received in the spring holder 13. Several Belleville springs 33 are mounted on the piston shaft 32 between the auxiliary piston 27 and the spring holder 13 to urge the auxiliary piston forwardly.

A threaded socket 34 is mounted on the threaded portion 26 on the adjust bolt 24 so as to threadedly engage it with its front end butting against the auxiliary piston 27. There is provided a thrust bearing 35 between the rear end of the threaded socket 34 and a shoulder on the inner wall of the piston shaft 32. A roller clutch 36 is mounted on the threaded socket 34 and a spring clutch 37 is provided on the outer periphery of the roller clutch 36.

Figure 2:
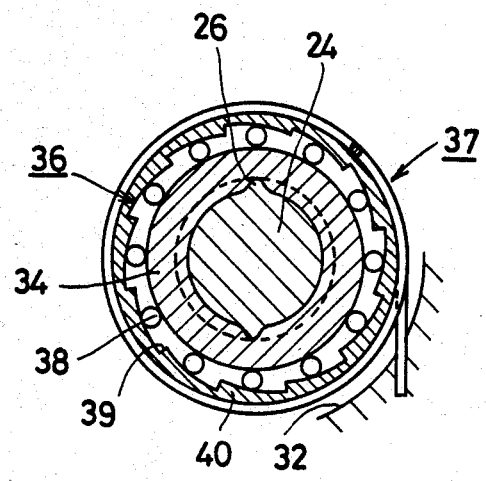
FIG. 2 is an enlarged sectional view taken along the line A—A in FIG. 1.

As shown in FIG. 2, the roller clutch 36 comprises a plurality of rollers 38 mounted on the threaded socket 34, and a casing 40 formed in its inside with a plurality of grooves 39 each having a slanting bottom with a large radius of curvature to form a one-way clutch. In the preferred embodiment, when the socket 34 turns right-handed (as viewed from line A—A in FIG. 1), the clutch will prevent it from turning. When it turns to the opposite direction, the clutch will allow it to turn.

The spring clutch 37 comprises a spring wound around the casing 40 with its one end secured to the casing 40 and its other end secured to the piston shaft 32. The spring clutch offers a required frictional force against the rotation of the casing 40.

A coupling 44 of a clutch shaft 43 slidably fits on a head 42 of the adjust bolt 24 so as to be turnable with the adjust bolt. Around the clutch shaft 43 is mounted a roller clutch 45 similar to the one shown in FIG. 2. The casing of the roller clutch 45 is supported by a clutch holder 46 inserted into the piston shaft 32 from its rear end. The roller clutch 45 serves to prevent the adjust bolt 24 from turning to one direction clockwise as viewed from the left in FIG. 1.

The clutch holder 46 is secured to the piston shaft 32 by bolts 47. When replacing the brake pads 5, 6, the clutch holder 46 is removed with the roller clutch 45 and the clutch shaft 43. After removal, the adjust bolt 24 can be turned with a tool.

Next, the operation of the negative acting disc brake according to the present invention will be described below.

Braking and release

Abutting the rear end of the threaded portion 25 on the adjust bolt 24, the auxiliary piston 27 is normally urged by the Belleville spring 33 to push the piston 17 which in turn presses the brake pad 6 against one side of a disc 48. By the effect of the reaction force in response to the pressing force, the calipers 2 and 3 integral with each other move rightwardly so that the other brake pad 5 will be pressed against the other side of the disc 48.

When the fluid pressure is supplied to the chamber 30 through the inlet port 31, the auxiliary piston 27 will retract while compressing the Belleville spring 33. This will release the brake. The maximum stroke of the auxiliary piston 27 is determined by the fluid pressure applied, but is usually set to one stroke S of the piston 17 plus the amount x of abrasion of the brake pads 5, 6 caused by one braking. Thus, if the amount of abrasion is zero, the maximum stroke will be S.

Supposing that the amount of abrasion is zero, the piston 17 will retract by one stroke S by the effect of the force of the retraction spring 21 and the auxiliary piston 27, too, will retract by the same distance S.

Adjustment of Clearance

Now, let us assume that as a result of a single braking, the brake pads 5, 6 abrade by an amount x. Then the stroke of the auxiliary piston 27 and the piston 17 in their forward movement (at the next braking) will be S+x. Upon release of brake, the auxiliary piston 27 will retract for a distance, S+x, while the piston 17 retracts only for the distance S because it is prevented by the frictional force of the retraction ring 20 from retracting further.

Thus, when the auxiliary piston 27 retracts by (S +x), the piston 17 gives the adjust bolt 24 a pulling force to the left on FIG. 1. Since the adjust bolt 24 engages the auxiliary piston 27 on the threaded portion 26 through the socket 34, a turning force is applied to the adjust bolt 24 and the socket 34.

When the socket 34 tends to move to the right relative to the threaded portion 26, it is given a force to turn it right-handed. But, the rollers 38 in the roller clutch 36 get caught in the groove 39 and the casing 40 is prevented from rotation by the spring clutch 37. Thus, roller clutch 36 is in its engaged state to prevent the socket 34 from turning.

On the other hand, because the roller clutch 45 is free, the adjust bolt 24 turns left-handed so that it will move to the right away from the piston 17 by an amount X.

Now, suppose that the lead of the threaded portion 25 is $L_1$, that of the threaded portion 26 is $L_2$, and the number of revolutions of the adjust bolt 24 is N, $$N = \frac{1}{L_2}(x - X) \quad (1)$$

Since $X = L_1 N$, $$X = \frac{L_1}{L_1 + L_2} x$$

The above equation indicates that the amount of adjustment X at a single braking is proportional to the amount of abrasion x. Thus, X will be substantially equal to x after several brakings. This means that the amount of abrasion has been absorbed after them.

Let us suppose that brake is applied by a number of times n after occurrence of excess stroke $x_i$ (that is, the amount of abrasion). The amount of adjustment $X_n$ at the braking is expressed:

$$X_n = x_i \left(\frac{L_2}{L_1 + L_2}\right)^{n-1} \times \left(\frac{L_1}{L_1 + L_2}\right) \quad (2)$$

As the number of time n increases, $X_n$ will come close to zero. Thus, the gap will approach toward S.

When the fluid pressure is released from the chamber 30 through the inlet port 31, the auxiliary piston 27 will advance. Even after release, there is a gap Y between the rear end of the threaded portion 25 on the adjust bolt 24 and the auxiliary piston 27, the gap being expressed:

$$Y = x - X = \frac{L_2}{L_1 + L_2} x \qquad (3)$$

Thus, the socket 34 moves for a distance Y relative to the threaded portion 26 on the adjust bolt 24 while the auxiliary piston advances and comes into engagement with the threaded portion 25 on the adjust bolt 24.

At this time, a right-handed turning effort acts on the socket 34 while a left-handed turning effort does on the threaded portion 26. The socket 34 is free to turn because the roller clutch 36 permits its rotation, while the adjust bolt 24 is prevented from turning by the roller clutch 45. Only the socket 34 turns around the threaded portion 26, advancing with the auxiliary piston 27.

When the auxiliary piston again engages the threaded portion 25 on the adjust bolt 24, the piston 17 will be pressed by the adjust bolt to press the brake pad 6 against the disc 48. At this time, the point at which the piston 17 starts to push is closer to the disc 48 by the amount of adjustment X (generally, $X_i$) than in the last braking. This means that the amount of abrasion of the brake pads 5, 6 has been compensated.

Replacement of brake pads

When the brake pads 5, 6 have abraded to the limit, they are replaced as follows. For the replacement, fluid pressure is applied against the auxiliary piston 27 to release the brake.

Firstly, the clutch holder 46, the roller clutch 45 and the clutch shaft 43 are removed from the piston shaft 32. The adjust bolt 24 is then turned right-handed with a tool engaged in its head 42. When it is turned right, the roller clutch 36 will get engaged. But, a large torque applied with the tool forces the casing 40 of the roller clutch 36 to slide with respect to the spring clutch 37 so that the adjust bolt and the socket 34 will turn integrally.

By turning the adjust bolt 24, the piston 17 is retracted rightwardly to provide a clearance for inserting new brake pads. After they have been mounted, the adjust bolt 24 is turned to the reverse direction to move the piston 17 leftwardly to restore the normal clearance between the piston 17 and the brake pads.

What are claimed are:

1. A negative acting disc brake comprising a torque member, an outer caliper, an inner caliper, a pair of brake pads mounted on the opposing surfaces of said outer and inner calipers, a cylinder member mounted in said inner caliper and formed with an annular flange to form therein a first cylinder and a second cylinder, a first piston mounted in said first cylinder for pressing one of said brake pads, an adjust bolt having a first threaded portion threadedly engaging said first piston, a second piston mounted in said second cylinder and adapted to engage said adjust bolt to press said first piston toward said one of said brake pads, said second piston being normally urged toward said first piston and adapted to retract when fluid pressure is applied to said second cylinder, said adjust bolt having a second threaded portion which has a larger lead than said first threaded portion and is reverse thereto in direction, a threaded socket mounted on said second threaded portion on said adjust bolt to threadedly engage it and adapted to engage said second piston, and a one-way clutch interposed between said threaded socket and said second piston so as to prevent said socket from turning when said adjust bolt turns in such a direction as to move away from said first piston and allow it to turn when said adjust bolt tends to turn in a reverse direction.

2. The disc brake as claimed in claim 1, wherein said second piston is normally urged by a spring.

3. The disc brake as claimed in claim 1, further comprising a one-way clutch adapted to prevent said adjust bolt from turning in such a direction as to move toward said first piston.

4. The disc brake as claimed in claim 1, wherein said first piston is adapted to be retracted by a retraction spring.

* * * * *